D. E. HOWATT.
MILKING DEVICE.
APPLICATION FILED APR. 20, 1913.
1,117,849.
Patented Nov. 17, 1914.
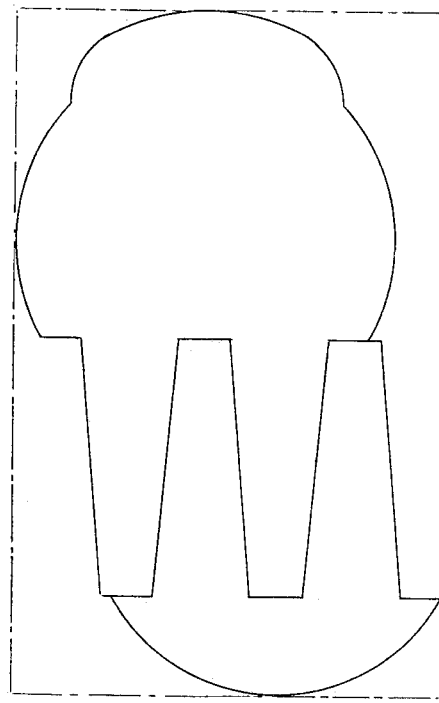
FIG-4
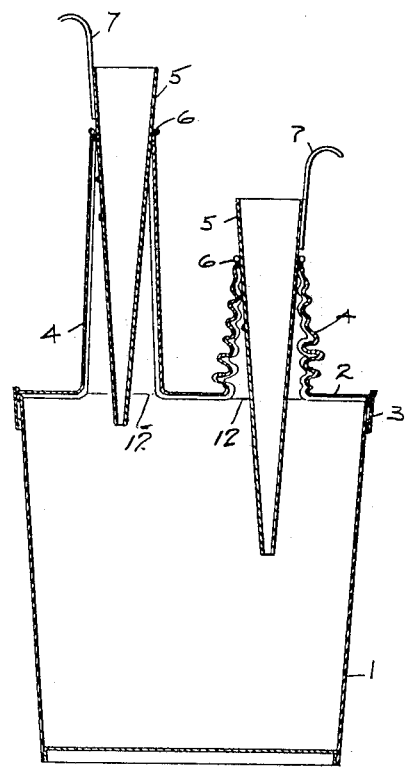
FIG-1
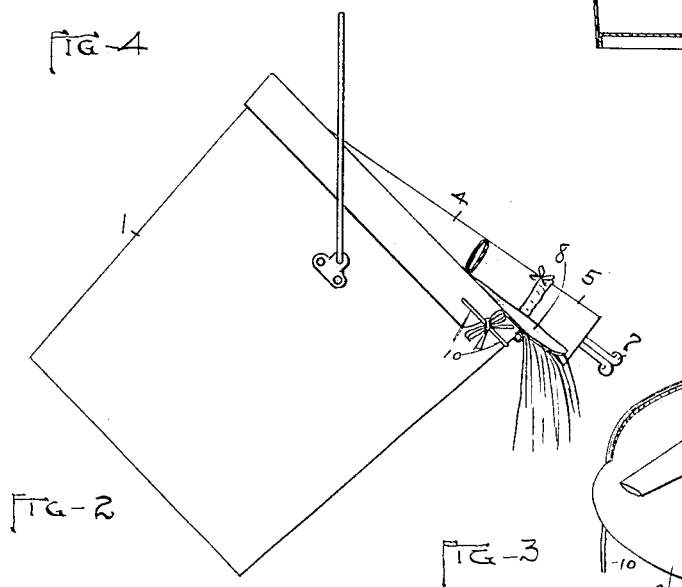
FIG-2
FIG-3
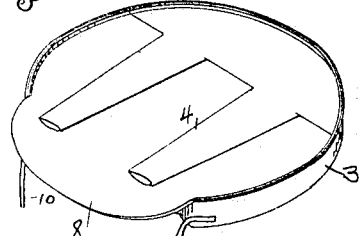
WITNESSES
Oliver M. Kappler
Horace B. Jay
INVENTOR
David E. Howatt
BY J. B. Jay
ATTORNEY

UNITED STATES PATENT OFFICE.

DAVID E. HOWATT, OF YOUNGSTOWN, OHIO.

MILKING DEVICE.

1,117,849.  Specification of Letters Patent.  Patented Nov. 17, 1914.

Application filed April 20, 1912. Serial No. 692,192.

*To all whom it may concern:*

Be it known that I, DAVID E. HOWATT, a citizen of the United States, and a resident of Youngstown, county of Mahoning, and State of Ohio, have invented a new and useful Improvement in Milking Devices, of which the following is a specification, the principle of the invention being herein explained and the best mode in which I have contemplated applying that principle, so as to distinguish it from other inventions.

The present invention relates to a milking device and is an improvement on the construction shown in my co-pending application Serial No. 593,353, filed November 21, 1910. It is, however, adapted to much more general use than is the construction shown in such application, since it may be adjusted to fit almost any size of milk receptacle in general use, and not a specially constructed pail only. It is further adapted to provide means for emptying the pail without removing the cover, thus preventing the contamination of the milk by dirt or dust in the atmosphere.

To the accomplishment of these and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—Figure 1 is a vertical section through a milk pail to which my device is attached; Fig. 2 is a side elevation of the same when the milk is being poured therefrom; Fig. 3 is a view in perspective of my cover; and Fig. 4 is a diagrammatic view showing how the two pieces of material which form the cover proper, are economically cut from one piece of cloth.

In Fig. 1 there is shown a milk pail 1 which may be of any general construction, to which will be attached a flexible cover 2 by means of a band 3 which encircles the upper outer side of the pail, and is held in this position by means of cords or flat tape 10. In the cover 2 there will be apertures 12, and tubular flexible extensions 4 will be attached to the cover around these apertures and will project upwardly therefrom. Both the cover, the band, and these tubular extensions will be of flexible material, preferably of some closely woven cloth, such as light canvas. Rigid flared tubes 5 will be directed into the apertures 12 and will be provided near the upper end with annular radial extensions 6 over which the end of the tubular flexible members will pass and will be held in close engagement. To the upper end of these flared tubes are attached handles 7 which will be preferably of curved wire and will rest freely upon the fingers of the operator. At one side of the cover a flap 8 will be provided and will extend slightly beyond the periphery of the pail. This flap will normally hang down over the side of the pail and will prevent the entrance of dirt or dust, but when the pail is tipped to that side, as shown in Fig. 2, the flap will be slightly raised from the pail by the movement of the milk, and the milk can then be poured from between the flap and the edge of the pail. During such operation the flap will, of course, become moistened, but this will in no way affect the sanitary pouring, since the dust or dirt cannot pass through even the moistened portion of the flap. Any desired means of constructing such a cover may, of course, be used, but an economical method of cutting a cover out of a single piece of cloth is that shown in Fig. 4. The upwardly projecting extensions on the cover are preferably placed near one side of the same, and by cutting the cloth along the solid lines in Fig. 4, it is possible to so form two pieces of cloth that when they are placed together along the edges they will form a cover of the desired shape, and also two upwardly projecting extensions, as will be readily seen from an inspection of this figure.

When the cover has once been adjusted to the pail the operation of the same will be very similar to that of the milking device described in my co-pending application already referred to. The operator will place the handles 7 over the little fingers of his two hands, and will then grasp the teats of the cow, the milk flowing directly into the flared tubes substantially without contact with the atmosphere. The tubes may, of course, be used at different heights, since the tubular extensions will crumple or telescope as the rigid tubes are raised or lowered vertically. Attention is directed to the snug engagement of the cover on the pail. By forming the band 3 with a smaller diameter on its lower edge than on its upper edge, it is made to conform to the taper of the pail and thus the tightening of the cord draws the cover down onto the pail, giving a very snug and dust-proof engagement.

The advantages of the present construction are numerous. The telescoping shields or extensions are made integral with the cover and need not be removed, thus permitting of the cleansing or sterilizing of the cover at one operation. There is also a very free side swinging effect possible in the tubes, since the tubes may be placed in the position shown in Fig. 2 flat on the cover, if desired. This freedom of movement assists the operator to a considerable extent. Furthermore, the present device is extremely simple in construction and inexpensive to manufacture, and within reasonable limits may be adjusted to fit almost any size of milk pail. The milk may be poured directly from the pail into which it is milked, without removing the cover preventing any deposit of dust or dirt on the milk.

The covers will of course, be made in several sizes, but the limits of adjustment are so great for each cover that but few sizes will be needed.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A milking device, comprising an adjustable, flexible cover provided with an aperture, a tube directed into such aperture, and means adapted to close such aperture about said tube.

2. A milking device, comprising a flexible cover provided with an aperture, a tube directed into such aperture, means adapted to close such aperture about said tube, and means for adjusting said cover to various sized receptacles.

3. A milking device, comprising a flexible apertured cover adapted to be attached to a suitable receptacle, a flexible tubular extension connected to said cover about such aperture, a tube directed into such aperture and securely fitted into said extension, and means for adjusting said cover to various sized receptacles.

4. A milking device, comprising a flexible apertured cover adapted to be attached to a suitable receptacle, a flexible tubular extension connected to said cover about such aperture, a tube directed into such aperture and securely fitted into said extension, and cords attached to opposite sides of said cover and adapted when connected to adjust said cover to various sized receptacles.

5. A milking device, comprising a flexible apertured cover adapted to be attached to a suitable receptacle, a flexible tubular extension connected to said cover about such aperture, a tube directed into such aperture and securely fitted into said extension, means for adjusting said cover to various sized receptacles, and a normally covered pouring spout in said cover.

6. A milking device, comprising a flexible apertured cover adapted to be attached to a suitable receptacle, a flexible tubular extension connected to said cover about such aperture, a tube directed into such aperture and securely fitted into said extension, and means for adjusting said cover to various sized receptacles, one side of said cover being produced to extend loosely over the side of the receptacle, thereby forming a pouring spout when said receptacle is inclined to that side.

7. A milking device, comprising a flexible apertured cover, a tube directed into such aperture, and means for adjusting said cover to various sizes of receptacles.

8. A milking device, comprising a flexible apertured cover, a tube directed into such aperture and means for adjusting said cover to various sizes of receptacles, said means including a projecting band attached to said cover proper and adapted to engage the sides of the receptacle, and cords attached to said band and adapted to draw the same into secure engagement with the sides of such receptacle.

Signed by me this 17 day of April, 1912.

DAVID E. HOWATT.

Attested by—
MARY HOWELLS,
JOSEPH FRIEDMAN.

Copies of this patent may be obtained for five cents each, by addressing the "Commissioner of Patents, Washington, D. C."